United States Patent
Takahashi

[11] Patent Number: 5,911,357
[45] Date of Patent: Jun. 15, 1999

[54] BRAZING METHOD WITH FLUX OF ALMINIUM AND FURNACE THEREFOR

[75] Inventor: Susumu Takahashi, Yokohama, Japan

[73] Assignee: Kanto Yakin Kogyo K.K., Japan

[21] Appl. No.: 08/845,048

[22] Filed: Apr. 21, 1997

[30] Foreign Application Priority Data

Jun. 24, 1996 [JP] Japan .................................. 8-198251

[51] Int. Cl.$^6$ .............................. B23K 31/02; B23K 35/38
[52] U.S. Cl. ...................... 228/214; 228/217; 228/262.51
[58] Field of Search ................................. 228/214, 217, 228/219, 262.51

[56] References Cited

U.S. PATENT DOCUMENTS

| | | | |
|---|---|---|---|
| 3,116,549 | 1/1964 | Born et al. ............................... | 228/217 |
| 3,457,630 | 7/1969 | Schwartz et al. ........................ | 228/217 |
| 3,673,678 | 7/1972 | Moreau et al. .......................... | 228/219 |
| 4,804,128 | 2/1989 | Brittin ...................................... | 228/217 |
| 5,532,462 | 7/1996 | Butwell et al. .......................... | 219/695 |

*Primary Examiner*—Samuel M. Heinrich
*Attorney, Agent, or Firm*—Shlesinger, Fitzsimmons & Shlesinger

[57] ABSTRACT

A method of brazing aluminium parts with a solder of a melting point of 500–630° C. and a flux of a melting point of 550–500° C., the brazing being made by successively heating them at a comparatively low temperature of 580–660° C. under an inert gas atmosphere filled in an elongated muffle which is made of carbon, graphite or carbon fibre-reinforced carbon, wherein the muffle which contributes to keep the atmosphere at a high purity shall not be damaged by the flux liquidized with the heating of the parts, and wherein carbon of the muffle works to keep the atmosphere inert whereby the flux itself is also prevented from oxidation.

3 Claims, 1 Drawing Sheet

BRAZING METHOD WITH FLUX OF ALMINIUM AND FURNACE THEREFOR

BACKGROUND OF THE INVENTION

This invention relates to a method for brazing aluminium or alminium alloy parts, employing a brazing solder and flux. More particularly, this invention relates to such method, in which the flux itself would not be oxidized in a brazing atmosphere so that its amount could be at a minimum amount and so that it should neither pollute the brazing atmosphere and nor erode furnace structures surrounding the brazing atmosphere. This invention relates also to a continuous type of furnace which could advantageously be employed for successively brazing aluminium or alminium alloy parts.

Modern fluxes such as metallic fluorides which are disclosed in U.S. Pat. No. 4,475,960 of Yamawaki et al. and metallic chlorides mixed with metallic fluorides which are disclosed in U.S. Pat. No. 4,643,348 of Takahashi, are widely used in the brazing of aluminum parts. As they are so efficient to achieve their works for dissolving filmy oxides from alminium surfaces and removing the oxides from the surfaces and accordingly for allowing brazing solders to flow freely on and into the surfaces, their amount of use is minimized, whereby aluminium brazing costs become low. This contributes also to the prevention of pollution problems, because an amount of water for washing off fluxes after a brazing operation is minimized, and sometimes a washing step is eliminated in the brazing operation.

In order to have such fluxes which are used at a minimum amount exert their full capacities without the oxidation of fluxes themselves, it has been common and inevitable for brazing aluminium parts to employ as a brazing chamber such a metallic muffle as disclosed in U.S. Pat. No. 4,416,623 of Takahashi, which is hermetically filled with an inert atmosphere such as nitrogen, and in which the parts to be brazed are heated with a solder and flux applied on them. A heating temperature by which the aluminium or aluminium alloy parts are brazed, is 580° C.–660° C., since a melting point of the fluxes mentioned above is around about 550° C. and the flux most lately developed has a melting point of 500° C., and since Al–Si system solders which are generally employed for aluminium brazing together with the above-mentioned fluxes, have a melting point between 500° C. and 630° C.

From a thermal aspect, there is no problem at all to use a metallic muffle under such comparatively low heating temperature, as metals which form the muffle can stand well such temperature, although it has been noticed by the present inventor as drawbacks that fluxes employed in brazing aluminium parts break oxidized surface films of heat and rust-resisting steel of the metallic muffle too, when they are heated, decomposed, and liquidized or evaporated, and they finally spot the steel, whereby an inert atmosphere within the muffle is polluted. Partly because that such drawbacks have been taken unavoidable on the whole, and partly because that differently from and compared to other metals such as steel or Cu-base or Fe-base alloy containing a small amount of Al, aluminium and its alloy matrix of which is Al seemed too sensitive to heat-treatment within a muffle made from materials other than metallic materials, nobody has touched, in brazing aluminum parts, to replace the metallic muffle with one made from other materials, except prior cases such as disclosed in Japanese post-examination patent publication No. 7-60063 of Takahashi and in U.S. Pat. No. 5,538,177 of Takahashi. In the example of former case, steel is heated at a high temperature in a muffle case made from carbon or graphite solely for the purpose of hardening it without oxidation and decarbonization. And, in the examples of latter case, copper or iron-base alloys are welded at a very high temperature in a batch type chamber having carbon walls. However, in this latter case too, nothing was taught about damages the chamber will suffer on account of fluxes if it were made from metals, because such damages had not been expected there since the fluxes were used at a negligible amount as they intended to clean only Al constituent parts of a low percentage, since they were not required to render the alloys receptive to amalgamation with a solder as no solder was used there, and since decomposed and vaporized fluxes should not remain in the chamber long as the atmosphere in the chamber was changed repeatedly at each batch cycles.

BRIEF SUMMARY OF THE INVENTION

In this invention, the brazing of aluminium or aluminium alloy parts is made with a brazing solder of a melting point of 500–630° C. and a flux of a melting point of around about 550–500° C. and in an inert atmosphere surrounded by carbonaceous materials, more particularly within a muffle partly or wholly made of graphite and filled by a nitrogen atmosphere.

It has been discovered by the present inventor that a furnace chamber made of carbonaceous materials such as carbon, graphite, and carbon fibre-reinforced carbon are most advantageously employable for brazing aluminum therein under an inert atmosphere filled thereto and with the employment of a brazing solder and flux, since it is highly heat-resisting, and since it can hardly be eroded and damaged even when it makes contact for a long period of time with the flux decomposed and liquidized or vaporized therein. It shall be noted also that the inert atmosphere such as a nitrogen gas filled within the chamber, more particularly within the graphite muffle prevents the flux itself and the aluminium parts to be brazed from being oxidized further, and the nitrogen gas is in turn maintained inert by the graphite muffle as the oxygen gradually brought into the gas from the outside of furnace reacts with carbon of the muffle and is adsorbed into the muffle. While such adsorption brings about oxidative consumption of the muffle little by little, the muffle may industrially be operated for several years.

It has been discovered also that it is advantageous in practicing this invention especially when a comparatively large amount of oxygen is brought into the muffle, being caught by conveyors and aluminium parts, to place in the muffle a metallic element such as zinc, magnesium, and titanium which reacts well with oxygen at the heating temperature of the furnace of 580–660° C., and oxides of which are thermochemically stable and solid, and are not reductive by carbon. Such element captures oxygen flown into the muffle as an aerial disturbance, and makes it immobilized, contributing to maintain the nitrogen atmosphere inert.

EXAMPLES

Example 1

Figure 1:
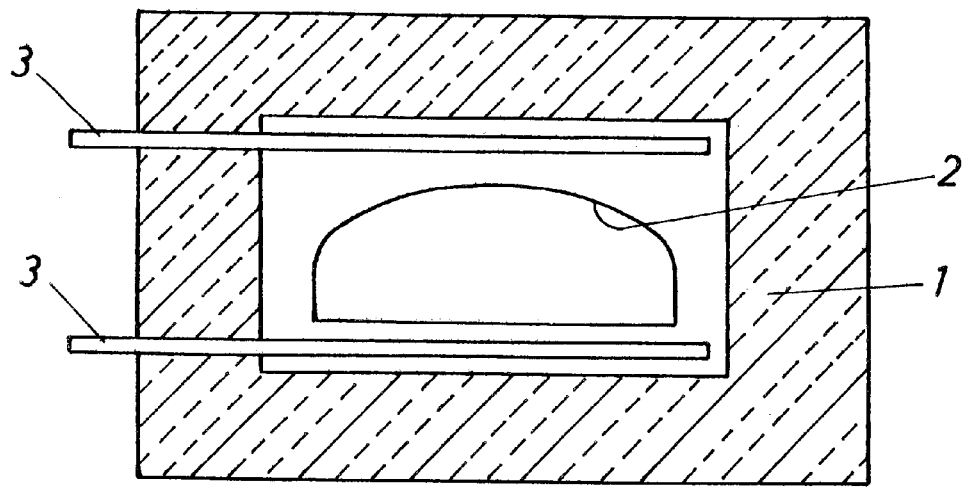
FIG. 1 is an explanatory sectional view of principal parts of an atmosphere furnace provided with a conventional metallic muffle.
Figure 2:
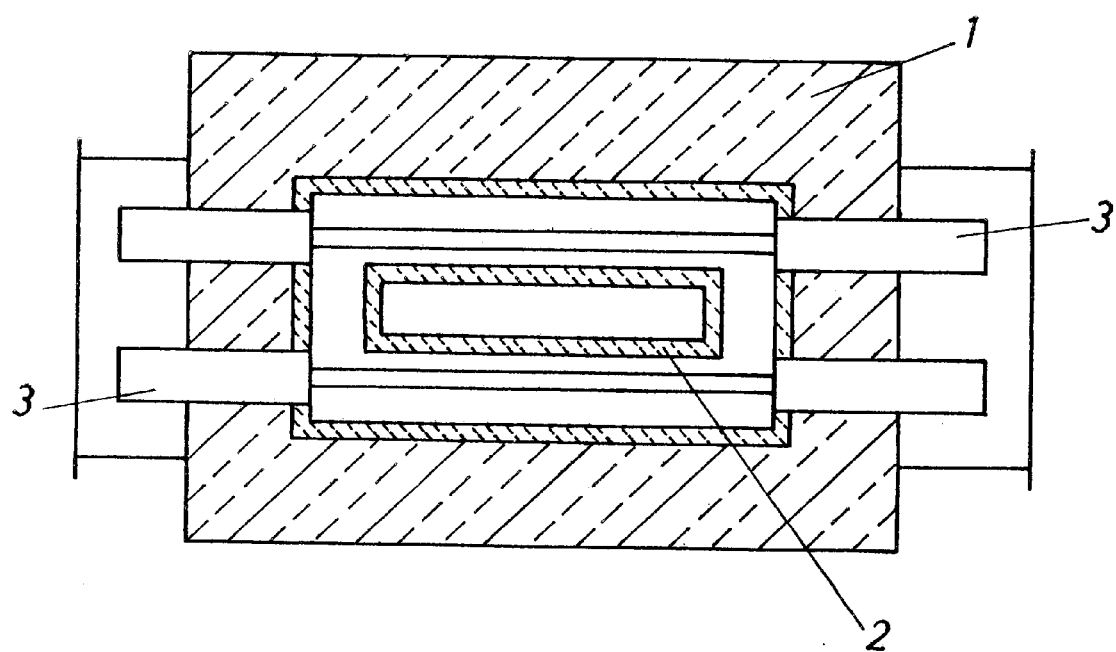
FIG. 2 is an explanatory sectional view of principal parts of another atmosphere furnace provided with a carbon muffle which is preferably employable for carrying out the method of this invention.

Employing a furnace provided with a conventional metallic muffle which constitutes a brazing chamber and is made of a steel plate of 20Cr20Ni type as illustrated in FIG. 1, and another furnace provided with a carbonaceous muffle which is made by sintering pure graphite in accordance with this invention and as illustrated by FIG. 2, damages the furnaces, more particularly their muffles had suffered and atmospheric conditions the muffles could keep were compared. When the brazing operation was conducted with the first-mentioned metallic muffle as described below for 342 hours, there were produced holes at its hearth and its atmosphere was accordingly adversely affected, while the furnace with the carbonaceous muffle was normally even after it run for 1,200 hours.

Each of the muffles 2 of the first and second-mentioned furnaces thus run for tests was of an elongated tunnel-like shape having a width of 600 mm, length of 6,000 mm, and actual height of 180 mm. The muffles, into which highly pure nitrogen was supplied from their tops at a rate of 30 m$^3$ per hour, were heated and kept at 600° C. by heating elements 3. An aluminum part to be brazed was coated with a brazing sheet of Al—Si system having a melting point of 590° C., and adhered with a flux of 60 g. and composed of chloride of alkali metal mixed with a fluoride and having a melting point of 547° C. Such aluminum parts were successively conveyed into each furnaces and brazed therein at a rate of 60 pieces per hour. Numeral 1 in FIGS. 1 and 2 represents heat-insulating sheathings.

While an oxygen amount in the muffles, into which highly pure nitrogen was supplied as described above, was normally kept as low as 25–55 ppm, the oxygen amount in the above-mentioned metallic muffle raised to 300–880 ppm suddenly when its furnace run for 342 hours, as air should have entered into the muffle through its hearth parts perforated. About 90% of those aluminium parts which passed through the metallic muffle after the oxygen amount therein exceeded 300 ppm, were not brazed well. On the other hand, the oxygen amount in the carbonaceous muffle was kept normal even after the brazing operation therewith run for 1,200 hours.

Example 2

Employing the furnace provided with the carbonaceous muffle 2 which was same to that described in Example 1, aluminium parts having tubular pockets in which air had been caught, were brazed at a rate of 60 pieces per hour. The oxygen amount in the nitrogen atmosphere within the muffle raised up to 110 ppm on account of the air isolated from the pockets. After plates of titanium were fitted onto the hearth of the muffle and to jigs which supported the aluminium parts, the brazing operation was restarted, resulting in producing the parts which had been brazed satisfactorily. The oxygen amount in the muffle was reduced to 30–50 ppm, as the titanium plates reacted with the oxygen in the furnace atmosphere and trapped therein the oxygen as oxides therewith.

Example 3

Example 2 was repeated, except that instead of employing the titanium plates, metallic zinc vapors with nitrogen were supplied into the carbonaceous muffle from the top thereof, whereby the oxygen amount in the muffle was kept at a range of 10–25 ppm, resulting in producing the parts which had been brazed very well.

While in the above examples, the carbonaceous muffle was made of carbon wholly over its entire length, it shall not necessarily be so. Those parts of the muffle which are adjacent to the inlet and outlet of the furnace where decomposed and liquidized fluxes do not affect the muffle so severely, may be made of metals.

As explained above and as described in concrete in the above examples, the successful brazing of aluminium or alminium alloy parts and articles with a solder and flux is operable in accordance with this invention under an inert atmosphere which can be stable for a long period of time.

I claim:

1. Method for brazing aluminium or alminium alloy parts with a brazing solder of a melting point of 500° C.–630° C. and a flux of a melting point around 550° C.–500° C., the brazing being made by heating the parts under an inert atmosphere wholly or partly surrounded by carbonaceous materials.

2. The method as claimed in claim 1, in which the parts are successively introduced under the inert atmosphere wholly or partly surrounded by the carbonaceous materials which form an elongated heating chamber.

3. The method as claimed in claims 1 or 2, in which the inert atmosphere is contacted with those metal elements such as zinc, magnesium, and titanium which make such oxides with oxygen which are thermochemically stable and not reductive by carbon.

* * * * *